United States Patent [19]

Chin et al.

[11] Patent Number: 5,743,722

[45] Date of Patent: Apr. 28, 1998

[54] COATING APPARATUS

[75] Inventors: Eiten Chin; Toshiharu Numata; Masayuki Sugawa; Takeshi Nakajima, all of Ichigai-machi, Japan

[73] Assignee: Kao Corporation, Tokyo, Japan

[21] Appl. No.: 654,790

[22] Filed: May 29, 1996

Related U.S. Application Data

[63] Continuation of Ser. No. 365,102, Dec. 28, 1994, abandoned.

[30] Foreign Application Priority Data

Dec. 28, 1993 [JP] Japan ................................ 5-348968
Mar. 25, 1994 [JP] Japan ................................ 6-077856

[51] Int. Cl.$^6$ ............................................. B05D 3/12
[52] U.S. Cl. ................................... 427/356; 118/411
[58] Field of Search .......................... 118/410, 411, 118/419; 427/356, 128

[56] References Cited

U.S. PATENT DOCUMENTS

| 4,854,262 | 8/1989 | Chino et al. ............................ 118/411 |
| 5,348,768 | 9/1994 | Shibata et al. ......................... 427/356 |

FOREIGN PATENT DOCUMENTS 63-88080  4/1988  Japan.
2-251265 10/1990  Japan.

Primary Examiner—Brenda A. Lamb
Attorney, Agent, or Firm—Oblon, Spivak, McClelland, Maier & Neustadt, P.C.

[57] ABSTRACT

A coating apparatus wherein downstream lips have coating work surfaces respectively where a magnetic dispersoid contacts with a web. A coating work surface of a second downstream lip which is positioned downstream with respect to the web feeding direction is set in a position so as to be apart from the web more than a tangential line which extends from a downstream end of a coating work surface of a first downstream lip which is positioned upstream with respect to the web feeding direction.

2 Claims, 2 Drawing Sheets

COATING APPARATUS

This application is a Continuation of application Ser. No. 08/365,102, filed on Dec. 28, 1994, now abandoned.

BACKGROUND OF THE INVENTION

1. Field of the invention

The present invention relates to a coating apparatus, more specifically, to an extrusion-type coating apparatus which is suitable for forming a multi-layer coating film on a base material.

2. Discussion of the Background

Conventionally, a technology is known in which multiple coating liquids are extruded onto a feeding base material to form a multi-layer coating film on the base material (such inventions as disclosed in JP-A-63-88080 and JP-A-2-251265).

According to this conventional technology, one upstream lip and two or more downstream lips are incorporated in a coating apparatus that has a plurality of slots formed between these lips; coating liquid can be extruded through the slots. The coating liquid may be of same or different composition and is extruded, through respective slot parts, onto a base material feeding from the upstream lip to the downstream lips. Thereby, the liquid coated on the base material at the upstream slots is overcoated by the other liquid at the downstream slots. In this way, a coating film of multi-layer structure is formed on the base material.

The surface of such a multi-layer coating film, formed on the base material according to the above- mentioned conventional art, is not always smooth. That is, depending on the coating conditions, streaky unevenness may develop on the surface or uneven coating parts may exist that lack upper or lower coating film.

Furthermore, a multilayer structure of a coating film is not stabilized if a coating work surface 5 of a second downstream lip 3 located downstream of the feeding direction of the base material (web) protrudes from a tangential line 6 toward the base material side at the downstream end "a" of a coating work surface 4 of a first downstream lip 2 located upstream of the feeding direction of the base material as shown in FIG. 4; in some cases, the upper layer may mix with the lower layer. Reference numeral 1 in FIG. 4 shows the upstream lip.

SUMMARY OF THE INVENTION

An object of the present invention is to provide for a coating apparatus that can stabilize a multi-layer structure of a coating film in view of the disadvantage of the prior art as discussed above.

The present invention provides for a coating apparatus having an upstream lip, at least two downstream lips, and slots formed between said lips from which slots coating liquid can be extruded, in which coating apparatus said coating liquids are applied to a base material feeding past said upstream lip and said downstream lips, wherein:

said respective downstream lips form coating work surface where said coating liquid contacts with said base material, and the coating work surface of the one downstream lip located downstream of the feeding direction of said base material is set in a position between two adjoining downstream lips so as to be apart from said base material more than the tangential line from the downstream end of the coating work surface of the other downstream lip located upstream of the feeding direction of said base material.

In the present invention, a distance d which is the minimum distance between the tangential line described above and the coating work surface of the one downstream lip located downstream of the feeding direction of said base material is set so as to be $$0.1 < t/d < 1.0$$

where, t represents the thickness of the undried coating film formed by extrusion from the slot that is installed between the one downstream lip located upstream of the feeding direction of said base material and the other downstream lip located downstream of the feeding direction of said base material and is just leaved from the coating apparatus.

Thus, the coating apparatus of the present invention can make the boundary of respective layers clear and stabilized to stabilize the multi-layer structure of the coating film since the coating work surface of the one downstream lip located downstream of the feeding direction of the base material is set in a position so as to be apart from the base material more than the tangential line from the downstream end of the coating work surface of the other downstream lip located upstream of the feeding direction of the base material.

The coating apparatus of the present invention can stabilize the multi-layer structure of the coating film and also inhibit generation of streaky unevenness caused by menisci developing in the direction of the coating width on the surface of coating film.

Accordingly, the present invention relates to a coating apparatus comprising an upstream lip; at least two downstream lips; and slots formed between the lips, such that coating liquids are extruded from the slots, the coating liquids being applied to a base material which feeds past the upstream lip and the downstream lips.

The respective downstream lips form coating work surfaces where the coating liquid contacts with the base material. A coating work surface of the one downstream lip of the at least two downstream lips located downstream with respect to a feeding direction of the base material is set in a position between two adjoining downstream lips so as to be apart from the base material more than a tangential line which extends from a downstream end of a coating work surface of the other downstream lip of the at least two downstream lips located upstream with respect to the feeding direction of the base material.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
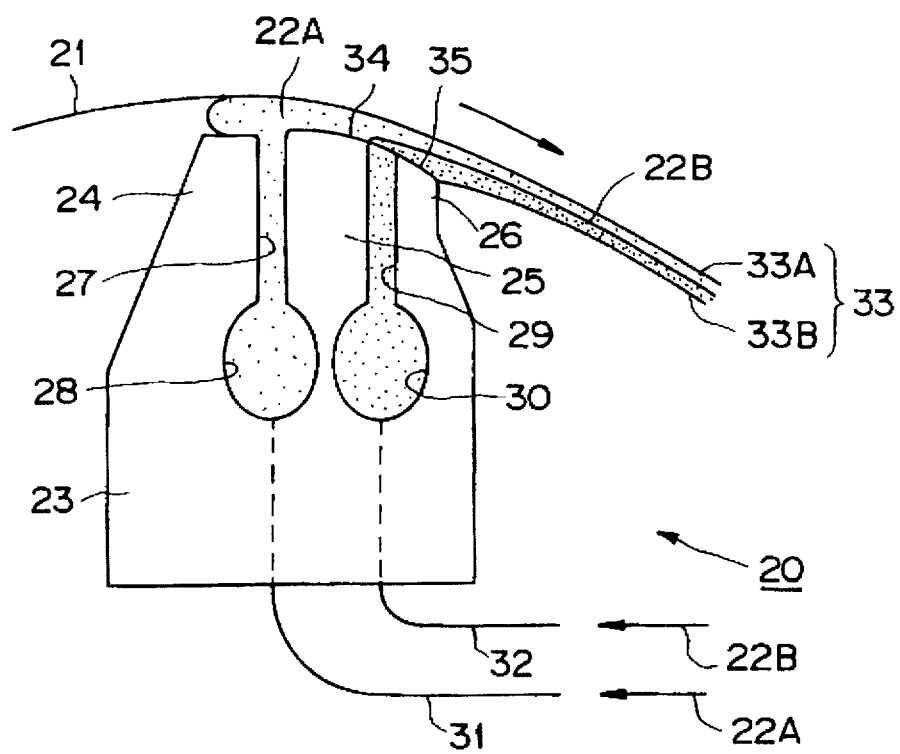
FIG. 1 is a cross section showing a die-head of a coating apparatus embodying the present invention.
Figure 2:
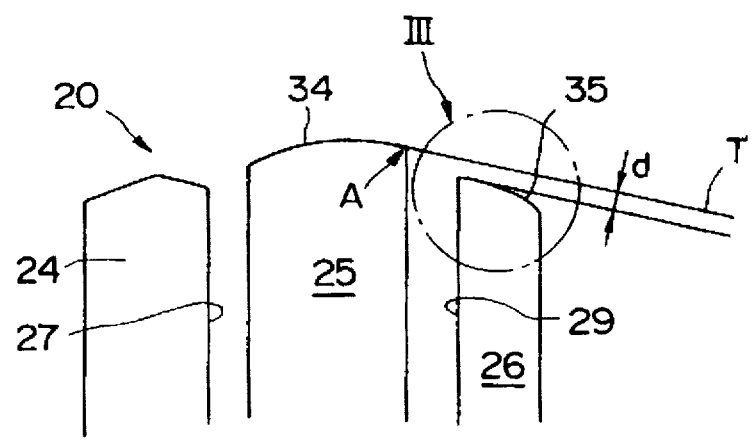
FIG. 2 is an enlarged cross section of a part of FIG. 1.
Figure 3:
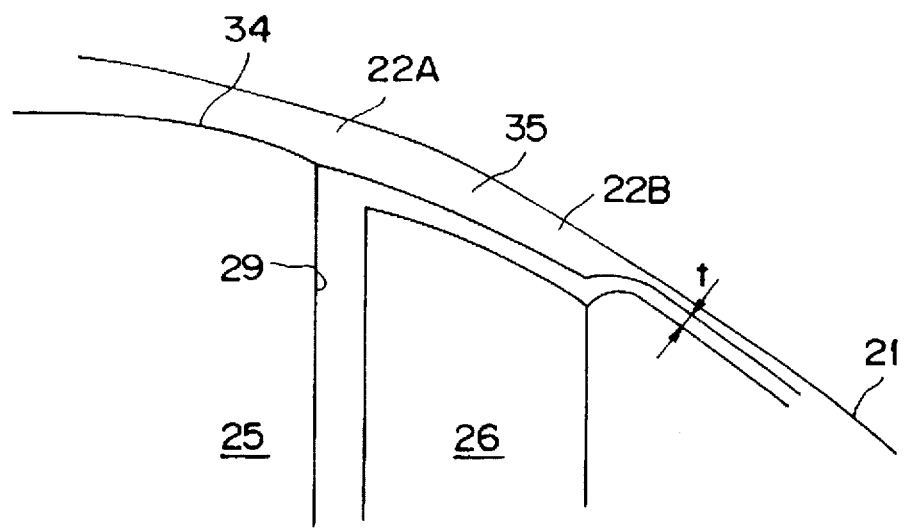
FIG. 3 is still another cross section further enlarging part III of FIG. 2.
Figure 4:
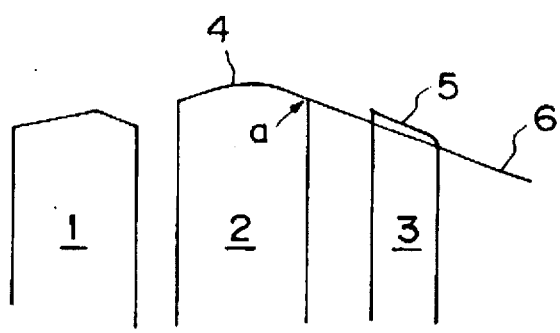
FIG. 4 is a cross section showing a coating work surface of the one downstream lip which protrudes from a tangential line toward the base material side at the downstream end of a coating work surface of the other downstream lip.

Referring now to the drawings, wherein like reference numerals designate identical or corresponding parts throughout the several view, a coating apparatus 20 illustrated in FIG. 1 is an extrusion-type coating apparatus in which coating film is applied to a base material feeding continuously to form a multi-layer coating film. The base material may be a flexible sheet or web made of plastic, paper, cloth or metal. The coating liquid may be magnetic dispersoid, light-sensitive liquid, heat-sensitive dispersoid or adhesive liquid to produce magnetic recording medium, photographic film, heat-sensitive paper or adhesive tape respectively. In the present embodiment, where a magnetic recording medium is produced, web 21 is used as the base material and magnetic dispersoids 22A and 22B are used as the coating liquid. Dispersoids 22A and 22B differ in the component composition as explained later.

Coating apparatus 20 comprises a die-head 23, which forms an upstream lip 24, a first downstream lip 25, and a second downstream lip 26 in this sequence in the feeding direction of web 21. A first slot 27 is formed between the upstream lip 24 and the first downstream lip 25. The first slot 27 communicates with a first liquid chamber 28. A second slot 29 is formed between the first downstream lip 25 and the second downstream lip 26. The second slot 29 communicates with a second liquid chamber 30.

The widths of the upstream lip 24, the first downstream lip 25 and the second downstream lip 26 are set to be nearly equal to the width of the web 21. The first slot 27 and the first liquid chamber 28 are constructed so as to extend along the whole widths of the upstream lip 24 and the first downstream lip 25. The second slot 29 and the second liquid chamber 30 are constructed so as to extend along the whole widths of the first downstream lip 25 and the second downstream lip 26.

The first liquid chamber 28 is connected with a first liquid supply system 31. The magnetic dispersoid 22A from the first liquid supply system 31 is distributed so as to make the coating amount in the direction of coating width uniform and supplied to the first slot 27. The second liquid chamber 30 is connected with a second liquid supply system 32. The magnetic dispersoid 22B from the second liquid supply system 32 is distributed so as to make the coating amount in the direction of coating width uniform and supplied to the second slot 29.

Web 21 is guided by guide rollers or other means (not shown) and feeds without being supported from the back surface in relation to upstream lip 24, first downstream lip 25 and second downstream lip 26. In coating apparatus 20, magnetic dispersoid 22A through first slot 27, and magnetic dispersoid 22B through second slot 29 are successively and continuously extruded and coated onto feeding web 21; thereby, multi-layer coating film 33 comprising lower coating film layer 33A and upper coating film layer 33B is formed. Lower coating film layer 33A is made of magnetic dispersoid 22A, while upper coating film layer 33B is made of magnetic dispersoid 22B.

Coating work surfaces 34 and 35 that contribute to multi-coating are the surfaces that contact, at the front ends of respective surfaces of the first and second downstream lips 25 and 26, magnetic dispersoids 22A and 22B at opposite side of web 21. Coating work surfaces 34 and 35 are formed to be convex toward web 21. Coating work surface 35 of second downstream lip 26 is located away from a tangential line T that starts at the downstream end A along the feeding direction of web 21 on coating work surface 34 of first downstream lip 25. Distance d is the distance between the tangential line T mentioned above and coating work surface 35 of second downstream lip 26 and film thickness t is the thickness of the undried upper coating film 33B formed by extrusion from second slot 29 and just leaving from second downstream lip 26; then, in the present embodiment, distance d is set in the range represented by:

$$0.1 < t/d < 1.0$$

More exactly, distance d is defined as the shortest perpendicular, from tangential line T that starts at the downstream end A of coating work surface 34 of first downstream lip 25, to coating work surface 35 of second downstream lip 26.

Tables 1 and 2 show experimental results.

In these experiments, the constituents composition of lower coating film 33A was:

Metallic powder in needle-like shape comprising iron mainly: 100 parts by weight.

Alumina: 7 parts by weight.

Carbon black: 3 parts by weight.

Vinyl chloride—acrylic acid copolymer resin containing sulfonic acid group: 8 parts by weight.

Polyurethane resin containing sulfonic acid group: 6 parts by weight.

Stearic acid: 1 part by weight.

2-Ethylhexyl myristate: 2 parts by weight.

Polyisocyanate: 4 parts by weight.

Solvent (methyl ethyl ketone/toluene/cyclohexanone =2/1/2 by weight): 230 parts by weight.

and, constituents composition of upper coating film 33B was:

α-Fe$_2$O$_3$: 100 parts by weight.

Vinyl chloride—vinyl acetate copolymer: 10 parts by weight.

Polyurethane resin derived from polyester: 3 parts by weight.

Butyl stearate: 1 part by weight.

Oleic acid: 0.5 part by weight.

Solvent (methyl ethyl ketone/toluene/cyclohexanone=3/1/2 by weight): 250 parts by weight.

Feeding speed u of web 21 was 200 m/min. Let the width of web 21 be W and let the extruded amount of magnetic dispersoid 22B from second slot 29 be V, then film thickness t of upper coating film layer 33B in early dried conditions just leaving second downstream lip 26 is:

$$t = V/(W \cdot u)$$

Thus, film thickness t of upper coating film layer 33B can be made as desired by adjustment of V, which is the extruded amount of magnetic dispersoid 22B.

Table 1 shows the experimental results wherein d=10 μm while Table 2 shows the experimental results wherein d=5 μm. In both experiments, observation of stability of multi-layer structure and surface properties of coating film 33 with variation of film thickness t leads to the following conclusions: (1) when t/d <1.0, the boundary of lower coating film layer 33A and upper coating film layer 33B is stable and unevenness in the surface of coating film 33 disappears; (2) when t/d <0.6 in particular, the stability between the layers and surface properties are further improved; (3) when t/d >0.1, the streaky unevenness caused by menisci developing in the direction of coating width is decreased since the coating liquids leave from the die lip (work surface 35); and (4) when t/d >0.2, occurrence of the streaky unevenness caused by the menisci is completely prevented.

TABLE 1

| t (μm) | t/d | Conditions |
|---|---|---|
| 0 | 0 | XX |
| 1 | 0.1 | □ |
| 3 | 0.3 | ○ |
| 5 | 0.5 | ○ |
| 8 | 0.8 | Δ |
| 10 | 1.0 | X |
| 15 | 1.5 | X |

TABLE 2

| t (μm) | t/d | Conditions |
|---|---|---|
| 0 | 0 | XX |
| 1 | 0.2 | □ |
| 2 | 0.4 | ○ |
| 3 | 0.6 | Δ |
| 5 | 1.0 | X |

Notation for "Conditions" in Tables 1 and 2:
○: Good.
Δ: Partial unevenness.
□: Unevenness caused by the menisci appears partially.
X: Significant unevenness.
XX: Unevenness caused by the menisci develops in the whole surface.

As explained, the arrangement where $0.1 < t/d < 1.0$, preferably $0.2 < t/d < 0.6$, makes it possible that the multi-layer structure of multi-layer coating film 33 is stabilized and that coating film 33 of high quality free of unevenness caused by the menisci is formed on web 21.

While both of coating work surface 34 of first downstream lip 25 and coating work surface 35 of second downstream lip 26 were curved in above embodiment, it is also applicable for the case where only work surface 34 is curved and work surface 35 is flat. The present invention is also applicable for a coating apparatus for forming coating film of three or more layers although the above embodiment is related to coating film 33 of two layers. Moreover, when forming coating film of three layers, the present invention is effected between the first (the one) downstream lip and the second (the other) downstream lip Also, the present invention is effected between the second (the one) downstream lip and the third (the other) downstream lip.

As explained hereinabove, the coating apparatus according to the present invention can stabilize the multi-layer structure of a coating film.

Although the invention has been illustrated and described with respect to several exemplary embodiments, it should be understood by those skilled in the art that the foregoing and various other changes, omissions and additions may be made to the present invention without departing from the spirit and scope thereof. Therefore, the present invention should not be understood as limited to the specific embodiment set out above but to include all possible embodiments which can be embodied within a scope encompassed and equivalents thereof with respect to the feature set out in the appended claims.

What is claimed as new and desired to be secured by letters patent of the United States:

1. A coating apparatus comprising:
an upstream lip;
at least two downstream lips which include a first downstream lip and a second downstream lip that are located downstream of the upstream lip with respect to a running direction of a base material, said second downstream lip of said at least two downstream lips located downstream of said first downstream lip of said at least two downstream lips with respect to the running direction of said base material; and slots formed between said upstream lip and said first downstream lip and between said first downstream lip and said second downstream lip, such that coating liquids are extruded from said slots, said coating liquids being applied to base material which runs past said upstream lip and said downstream lips, wherein said respective downstream lips form coating work surfaces where said respective coating liquid contacts said base material, a coating work surface of said second downstream lip is set in a position so as to be spaced apart from said base material by an amount thereafter referred to as a shortest distance d which is measured as a distance between from a tangential line which extends from a downstream end of a coating work surface of said first downstream lip and said coating work surface of said second downstream lip wherein said shortest distance is set so as to be $$0.1 < t/d < 0.8$$

where, t represents a thickness of an undried coating film formed by an extrusion of said respective coating liquid which just exits from said slot that is positioned between said first downstream lip and said second downstream lip.

2. A coating method, comprising a step of:
using a coating apparatus comprising,
an upstream lip,
at least two downstream lips which include a first downstream lip and a second downstream lip that are located downstream of the upstream lip with respect to a running direction of a base material, said second downstream lip of said at least two downstream lips located downstream of said first downstream lip of said at least two downstream lips with respect to the running direction of said base material; and slots formed between said upstream lip and said first downstream lip and between said first downstream lip and said second downstream lip, such that coating liquids are extruded from said slots, said coating liquids being applied to said base material which runs past said upstream lip and said downstream lips, wherein said respective downstream lips form coating work surfaces where said respective coating liquid contacts said base material, a coating work surface of said second downstream lip is set in a position so as to be spaced apart from said base material by an amount thereafter referred to as a shortest distance d which is measured as a distance between from a tangential line which extends from a downstream end of a coating work surface of said first downstream lip and said coating work surface of said second downstream lip wherein said shortest distance is set so as to be $$0.1 < t/d < 0.8$$

where, t represents a thickness of an undried coating film formed by an extrusion of said respective coating liquid which just exits from said slot that is positioned between said first downstream lip and said second downstream lip.

* * * * *